United States Patent
Schlaudraff et al.

(10) Patent No.: US 12,038,357 B2
(45) Date of Patent: Jul. 16, 2024

(54) METHOD FOR OBTAINING DISSECTATES MICROSCOPIC SAMPLE, LASER MICRODISSECTION SYSTEM AND COMPUTER PROGRAM

(71) Applicant: LEICA MICROSYSTEMS CMS GMBH, Wetzlar (DE)

(72) Inventors: Falk Schlaudraff, Butzbach (DE); Florian Hoffmann, Giessen (DE); Christoph Greb, Marburg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 344 days.

(21) Appl. No.: 17/667,580

(22) Filed: Feb. 9, 2022

(65) Prior Publication Data
US 2022/0276136 A1    Sep. 1, 2022

(30) Foreign Application Priority Data

Mar. 1, 2021 (EP) ...................................... 21159988

(51) Int. Cl.
*G01N 1/04* (2006.01)
*G01N 1/28* (2006.01)
(Continued)

(52) U.S. Cl.
CPC ............. *G01N 1/286* (2013.01); *G06N 20/00* (2019.01); *G01N 2001/045* (2013.01);
(Continued)

(58) Field of Classification Search
CPC ..... G01N 2001/045; G01N 2001/2886; G01N 1/04; G01N 1/06; G01N 1/286; G01N 2001/2873
See application file for complete search history.

(56) References Cited

U.S. PATENT DOCUMENTS 5,998,129 A * 12/1999 Schutze ................ B01L 3/0244
                                                    435/40.52
7,044,008 B1 * 5/2006 Schutze ................ G02B 21/26
                                                    73/863.01
(Continued)

FOREIGN PATENT DOCUMENTS

DE     100 18 253 C2    8/2003
DE   102013226782 A1 *  6/2015 ........... B23K 26/082
(Continued)

OTHER PUBLICATIONS

Bancroft, John D. and Marilyn Gamble (Ed.), "Laser Microdissection", Theory and Practice of Histological Techniques, Churchill Livingstone/Elsevier, Netherlands, Dec. 2008, pp. 575-576.
(Continued)

*Primary Examiner* — Herbert K Roberts
(74) *Attorney, Agent, or Firm* — LEYDIG, VOIT & MAYER, LTD.

(57) ABSTRACT

A method for obtaining dissectates from a microscopic sample using a laser microdissection system having a laser unit includes: a) at least partially circumcising and releasing from the sample dissectate regions of the sample as the dissectates using laser pulses provided by the laser unit; b) transferring the dissectates, by being released from the sample, along dissectate trajectories into receptacles of a dissectate collection unit; and c) positioning the receptacles of a dissectate collection unit using a positioning unit to collect the dissectates. The positioning of the receptacles of the dissectate collection unit using the positioning unit is automatically performed based on estimates of the dissectate trajectories, the estimates of the dissectate trajectories being obtained in a learning mode, the learning mode including obtaining dissectates by repeatedly performing at least steps (Continued)

a) and b). Parameters of the dissectate trajectories are determined for a plurality of dissectates.

16 Claims, 5 Drawing Sheets

(51) Int. Cl.
    *G06N 20/00*           (2019.01)
    *G02B 21/06*           (2006.01)
    *G02B 21/26*           (2006.01)

(52) U.S. Cl.
    CPC ...... *G01N 2001/2886* (2013.01); *G02B 21/06* (2013.01); *G02B 21/26* (2013.01)

(56) References Cited

U.S. PATENT DOCUMENTS

| | | | |
|---|---|---|---|
| 2003/0133190 A1 | 7/2003 | Weiss | |
| 2007/0066967 A1* | 3/2007 | Sieckmann | G02B 21/365 606/13 |
| 2008/0269637 A1* | 10/2008 | Schutze | G01N 1/2813 600/564 |
| 2016/0370315 A1* | 12/2016 | Schlaudraff | G01N 1/2813 |
| 2018/0073961 A1* | 3/2018 | Sawada | G01N 1/286 |
| 2019/0224678 A1 | 7/2019 | Wheeler et al. | |

FOREIGN PATENT DOCUMENTS

| | | | | |
|---|---|---|---|---|
| WO | WO-2010034289 A1 * | 4/2010 | | G01N 1/28 |
| WO | WO-2017211644 A1 * | 12/2017 | | |

OTHER PUBLICATIONS

Vincenzo Paduano et al.: "Fully automated organ bud detection and segmentation for Laser Capture Microdissection applications," 2011 IEEE International Conference on Imaging Systems and Techniques (IST), Malaysia, IEEE, May 17, 2011 (May 17, 2011), pp. 118-123, XP031907210.

Podgorny, Oleg V.: "Live cell isolation by laser microdissection with gravity transfer," Journal of Biomedical Optics, SPIE, 1000 20th St. Bellingham WA 98225-6705 USA, vol. 18, No. 5, May 9, 2013 (May 9, 2013), pp. 055002-1-055002-8, XP060024149.

* cited by examiner

METHOD FOR OBTAINING DISSECTATES MICROSCOPIC SAMPLE, LASER MICRODISSECTION SYSTEM AND COMPUTER PROGRAM

CROSS-REFERENCE TO PRIOR APPLICATION

Priority is claimed to European Patent Application No. EP 21159988.1, filed on Mar. 1, 2021, the entire disclosure of which is hereby incorporated by reference herein.

FIELD

The present invention relates to a method for obtaining dissectates from a microscopic sample, to a laser microdissection system and to a computer program.

BACKGROUND

Laser microdissection is a powerful and non-destructive technique for obtaining single cells or cell regions from specific areas of microscopic specimens, which can then be subjected to a variety of examination techniques. For an overview, reference is made to relevant textbooks, for example the chapter "Laser Microdissection" in John D. Bancroft and Marilyn Gamble (eds.), Theory and Practice of Histological Techniques, Churchill Livingstone/Elsevier, 2008, page 575.

In laser microdissection, the cell and tissue morphology and at the same time the macromolecules in the cell are largely preserved. Therefore, the examination of the respective genetic information and proteins is possible on the obtained cells by appropriate procedures. Laser microdissection can be used to process various microscopic samples, such as frozen samples, tissue sections embedded paraffin or synthetic resins, smears of blood and other body fluids, and cell cultures. In addition to such biological samples, laser microdissection may also be able to process artificial materials or plastics, glass, and thin sections of metals, minerals or rock samples.

Tissue sections and other specimens may be stained or otherwise labeled for use in laser microdissection using known staining techniques, such as hematoxylin/eosin, or may be used in an unstained state. In particular, immunohistochemical staining techniques can be used together with fluorochromes or chromogens, or methods such as fluorescence in situ hybridization can be performed. The staining or labeling techniques used in this connection may depend in particular on the nature of the investigations to be carried out subsequently.

Terms such as "sample", "object", "examination object" and the like are used synonymously in the following and can refer to any type of the stained or labeled or unstained or unlabeled sample explained above. In particular, objects for use in laser microdissection are fixed or immobilized on a carrier in a manner known per se, and, if necessary, covered by means of a membrane.

The general term "laser microdissection" is used for a large number of different process variants. Such process variants are described in in the technical literature and are for this reason only briefly summarized below. The present invention can in principle be used in connection with all process variants compatible therewith.

In all cases, in laser microdissection, the positioning of the laser beam used for processing the sample is performed by a relative movement between the laser beam and the object under examination. In certain embodiments, this relative movement is realized by a horizontal movement of the sample stage. In an alternative embodiment, which was described for the first time in DE 100 18 253 C2, the microscope stage is arranged in a fixed position during microdissection or for (fine) positioning of the laser beam. In this embodiment, a laser scanning device is used, through which the laser beam is irradiated onto the object under examination via the microscope objective. The laser scanning device may comprise two thick transparent glass wedges which are inclined with respect to the optical axis and can be rotated independently of one another about the optical axis.

The glass wedges are preferably controlled by stepper motors, which cause the glass wedges to rotate relative to each other. The laser beam is guided through the glass wedges, causing it to be deflected by a deflection angle relative to the optical axis. By rotating the glass wedges about the optical axis, the deflection angle can be adjusted and varied, but the arrangement is made in such a way that the laser beam, in particular, always passes through the center of the rear objective pupil. This is achieved in particular by a suitable choice of the thickness and the inclination of the glass wedges. A corresponding laser microdissection system will also be further explained with reference to the enclosed FIG. 1.

The different variants of laser microdissection differ in particular in the way in which dissectates are detached from the sample and transferred to dissectate collecting vessels or to suitable carriers.

In one process variant, the laser beam is guided around the area to be dissected, referred to as "dissectate region" hereinbelow, in particular in the form of a cutting line, and thereby separated from the sample. If the sample is arranged on the underside of a coated slide or a slide covered by a membrane, the laser beam cuts through the sample and the membrane, if present, and the dissectates thus obtained may fall into a collecting vessel arranged below the sample ("gravity transfer").

In this connection, a cutting line can also be closed down to one or more remaining ridges by means of a finely focused laser beam, for example. Subsequent refocusing allows the laser beam to be widened and directed onto the remaining ridge(s), thereby releasing the dissectate. In this way, twisting and stress-induced deflection of the dissectates can be reduced.

In an alternative process variant, the cutting line can also be closed down to one or more remaining ridges, like explained before, optionally including a refocusing as well, but the one or more ridges may then be caused to rupture by applying one or more final laser pulses applied not to the ridges but to one or more positions within the dissectate region, thereby also releasing the dissectate In so-called laser pressure catapulting, on the other hand, the dissectate may be catapulted, in particular by directing suitable laser pulses onto one or more residual ridges of a cutting line, to a position within the area of the dissectate, or a cell to be dissected. Different physical phenomena are held responsible for the catapulting effect. The correspondingly catapulted cells can, for example, be collected in a sample vessel or attached to a membrane provided with an adhesive layer above the sample.

In so-called laser capture microdissection, cells are attached to a membrane while still on the carrier by the action of the laser beam. By lifting or pulling off the membrane, the target areas can be torn from the carrier, leaving them attached to the membrane. The dissectates detached in this way can then be transferred to an examination vessel together with the membrane.

In another variant, for example, living cells in a sterile culture dish or a corresponding slide can be covered with a light-absorbing membrane. Using the laser beam, cells of interest can be cut around below the membrane. When the membrane is removed, the cells remain in the culture dish or on the slide and unwanted cells can be detached along with the membrane. This variant is also referred to as cell ablation.

Laser light in the ultraviolet wavelength range is usually used for laser microdissection, and the laser beam used is usually pulsed. By focusing the laser beam, a high energy density is achieved with simultaneous narrow local limitation of the irradiated laser light. High pulse frequencies can be used, for example, for rapid cutting as well as for generating fine cut lines.

The present invention particularly relates to cases in which dissectate regions of a sample which are to be obtained as dissectates are at least partially circumcised along a cutting line by applying a series of laser pulses of a laser beam of a laser microdissection system, and in which the dissectate regions are released from the sample as the dissectates by applying releasing laser pulses of the laser beam to release positions in or adjacent to the dissectate regions, as explained in different alternatives for "gravity transfer" and "catapulting" methods before.

In such methods, the dissectates are, as an effect of releasing the dissectate regions from the sample, transferred along dissectate trajectories. In types of laser microdissection in which the dissectates are cut out of the sample and collected below the sample, the dissectates typically cannot be made to vertically fall into a collection vessel as they experience an impulse during separation from the sample which results in said trajectory deviating from the vertical direction. Also in laser pressure catapulting, the dissectates are not vertically "catapulted" from the sample. Such deviations from the vertical direction must be considered in order to allow for a collection of the dissectates, particularly when dissectate collection vessels are of a limited size.

Multiwell plates have become a tool of choice for analyzing any type of biological samples. So-called plate readers based on different optical principles are commonly used for analyzing samples in multiwell plates. For example, multiwell plates may be used to perform parallel experiments to test a plurality of conditions at the same time and a plate reader can be automated to repeatedly image every well in order to obtain time-lapse data in each of them.

Microdissectates may, as commonly known, be collected in multiwell plates in many types of laser microdissection. Particularly along with trends to reduce the dissectate sizes in laser microdissection, such as in methods to separate sub-cellular compartments of a biological cell in a sample, or for high throughput screening, a reduction in the well size (and an increase of the well number) of multiwell plates is desired. Instead of 96 well plates, for example, the use of 384 or even 1,536 well plates is of particular interest.

With a decreasing well size and/or an increasing well number, the effects of deviations of the dissectate become increasingly relevant. As it is to be avoided that dissectates get collected in "wrong" wells of a multiwell plate, the minimum well size usable is therefore limited in classical methods.

Against this background, the object of the present invention is to provide possibilities for collecting laser microdissectates with higher precision and better reliability, particularly for being able to use microwell plates with a larger number and/or smaller size of wells than commonly used in corresponding methods.

SUMMARY

In an embodiment, the present invention provides a method for obtaining dissectates from a microscopic sample using a laser microdissection system comprising a laser unit, comprising: a) at least partially circumcising and releasing from the sample dissectate regions of the sample as the dissectates using laser pulses provided by the laser unit; b) transferring the dissectates, by being released from the sample, along dissectate trajectories into receptacles of a dissectate collection unit; and c) positioning the receptacles of a dissectate collection unit using a positioning unit to collect the dissectates, wherein the positioning of the receptacles of the dissectate collection unit using the positioning unit is automatically performed based on estimates of the dissectate trajectories, the estimates of the dissectate trajectories being obtained in a learning mode, the learning mode including obtaining dissectates by repeatedly performing at least steps a) and b), and wherein parameters of the dissectate trajectories are determined for a plurality of dissectates formed at different dissectate regions.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
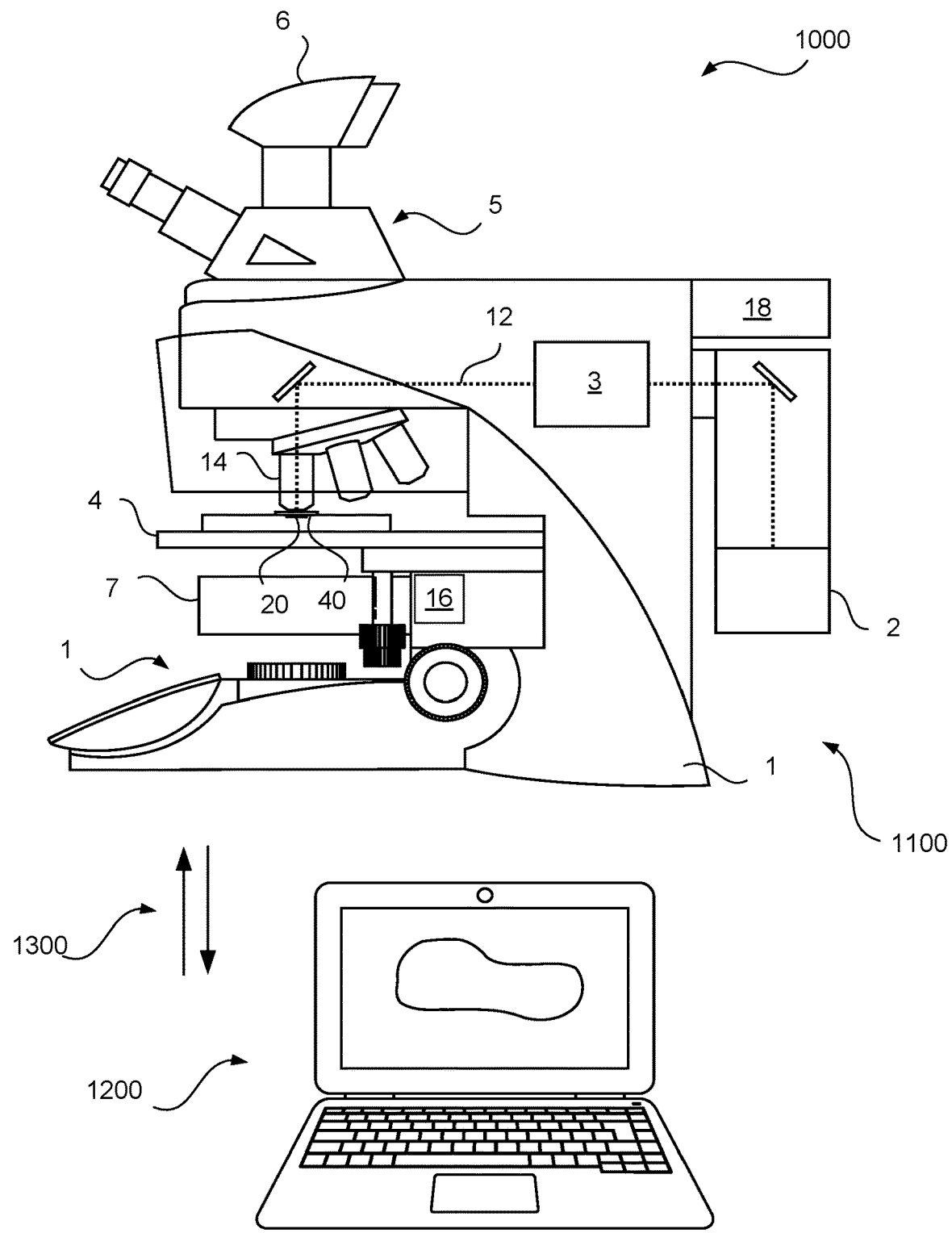
FIG. 1 schematically illustrates a laser microdissection system usable according to a preferred embodiment of the present invention.

In an embodiment, the present invention provides a method for obtaining dissectates from a microscopic sample, a laser microdissection system and a computer program.

In an embodiment, the present invention provides an advantageous alignment between collection vessels, particularly of a multiwell plate, which are referred to as "sample receptacles" hereinbelow is realized, such that also with smaller collection vessels, a reliable collection of dissectates in such vessels becomes possible. The present invention is, in this connection, based on an at least partial prediction of the dissectate trajectories explained above.

The parameters of these dissectate trajectories (speed, angle, curvature, etc.) depend on a number of effects which partly influence each other and which were previously considered to have a merely random effect, even for the same size, shape and/or releasing method used for obtaining the dissectates.

For example, it was observed empirically that smaller dissectates generally are trajected with larger trajection speed, at least at the start of the dissectate trajectories, as are larger dissectates. The trajectories are therefore influenced by the size (or area), but also shape (e.g. the roundness) of the dissectate regions. Also the weight of the dissectates (determined again by the size and shape, but also of the sample thickness) appears to play a decisive role in this connection. For different sizes, shapes, weights, etc., the dissectate trajectories were observed to be more or less well defined, i.e. they may either follow an essentially ballistic path or a path deviating from such a ballistic path. Different factors, including the initial impulse, gravity effects, viscosity effects of the surrounding air and of the dissectate material itself, temperature effects, etc. appear to influence the dissectate trajectories.

The dissectate trajectories were also observed or assumed to differ depending on further parameters such as the position(s) of the "last" laser pulse(s) which is or are used to release the dissectates from the sample, again in relation to the geometry and position of the dissectates, but also on the viscosity, the brittleness, the hardness and the dryness of the sample, on different fixing or embedding agents used for preparing the sample which influence the parameters just mentioned, on whether the sample is attached to a glass slide or to a sample carrier of a different type, on whether the sample is covered with a covering film or not, and on the material of the such a covering film, if present. This list of factors is not meant to be exhaustive.

As these factors partly depend on each other and are influencing each other in a way considered generally unpredictable, and as there may be even further factors influencing the dissectate trajectories which may be not known or detectable, at least by a regular operator of a laser microdissection system, the resulting dissectate trajectories were previously considered to be largely erratic and unpredictable as well. Therefore, in previous methods, the sample collection vessels always had to be chosen in a sufficient size to collect dissectates trajected according to all dissectate trajectories possible, i.e. a "safety margin" had to be included.

According to the present invention, however, it was surprisingly found that dissectate trajectories can be sufficiently well predicted by performing a learning mode in which a plurality of dissectates is obtained, for example using dissectate regions where identical or at least comparable sample parameters are present, and to analyze parameters of the dissectate trajectories, such as a landing point on a surface, for this plurality of dissectates. Doing so, the invention makes it possible to more specifically include the specific dissectate trajectories obtained for one sample or sample region into considerations for the selection of vessel sizes. As was found by the present inventors, the position of the final laser pulse or pulses which release the dissectates from a remainder of the sample, referred to as "releasing laser pulses" hereinbelow, has a significant influence on the parameters of the dissectate trajectories, but including the present invention also different parameters as indicated above, even if their effect is not predictable or these are not known, implicitly are considered by the learning mode.

This is true for "gravity transfer" based methods as well as for the "catapulting" methods as explained hereinbelow. That is, the present invention may equally be used in an advantageous manner in cases where the dissectate receptacles, particularly of a multiwell plate, are positioned geodetically above or below the sample. In the former case, the dissectate receptacles are preferably provided with an adhesive layer such that the dissectates being catapulted in the receptacles may be withheld therein.

By positioning the sample receptacle(s) according to a predicted trajectory, it can be assured, according to the present invention, that the dissectate trajecting according to a corresponding trajectory may safely and reliably collected in the intended sample receptacle. The prediction of the sample trajectories may be made, according to the present invention, by performing test dissection steps in which, particularly for a plurality of different dissectates, the corresponding trajectories and/or parameters thereof or resulting therefrom may be determined.

According to the present invention, a method for obtaining dissectates from a microscopic sample using a laser microdissection system a laser unit is provided. The laser microdissection system and the variant of the laser microdissection method may, as mentioned, be of any kind discussed hereinbefore, particularly a "gravity transfer" or "catapulting" based system or method, as in these cases dissectates are made to traject according to dissectate trajectories, parameters of which can be predicted as provided herein.

According to the present invention, in a step referred to as step a) hereinbelow, dissectate regions of the sample are at least partially circumcised and released from the sample as the dissectates by using laser pulses provided by the laser unit. With regard to further details, reference is made to the explanations above.

Step a) may include using all said laser pulses to completely cut around the dissectate regions, forming a closed cutting line, or using a part of said laser pulses to incompletely cut around the dissectate regions, leaving material ridges as explained above. In the latter case, a further part of said laser pulses, or a last one of said laser pulses, particularly after a refocusing operation, may be used to cut through the remaining ridge(s) or to cause the remaining ridge(s) to rupture via an application of said laser pulse(s) to a position within the individual dissectate regions. All possible alternatives, also including cases where a closed cutting line is formed but adhesion forces are overcome by "releasing" laser pulses are encompassed by the present invention and reference is made to the explanations given above.

In the present invention, the dissectates are, as a direct effect of releasing the dissectate regions, transferred along dissectate trajectories into receptacles of a dissectate collection unit. As mentioned, the dissectate trajectories may depend on spatial relations of the releasing positions and the dissectate regions, but a series of further influencing factors is existing as well. Step b), being a result of step a), may also be considered not to correspond to a specific and separate method step but a feature of the invention or effect directly resulting from step a) explained before.

According to the present invention, therefore, the dissectates are collected in receptacles of a dissectate collection unit, particularly in wells of a multiwell plate, and these receptacles are being positioned to collect the dissectates using a positioning unit. This step, referred to as step c) herein, is performed before the dissectates are actually released. While in classical arrangements, the receptacles of a dissectate collection unit are positioned essentially vertically above or below the dissectate regions and are selected to have a sufficient size to cover all possible dissectate trajectories, the present invention suggests to provide or position these receptacles at positions which are made dependent from predicted trajectories of the dissectates.

According to the present invention, therefore, said positioning of the receptacles of the dissectate collection using the positioning unit is automatically performed on the basis of estimates of the dissectate trajectories, the estimates of the dissectate trajectories being obtained in a learning mode.

Further according to the present invention, the learning mode includes obtaining dissectates by repeatedly performing at least steps a) and b) as indicated above, wherein parameters of the dissectate trajectories are determined for a plurality of dissectates which are formed at different dissectate regions.

In other words, "test dissections" or "test cuts" may be performed, preferably for different sizes and geometrical shapes of dissectates, and also including different positions of dissectate releasing laser pulses in relation to the positions and shapes of the dissectates, such that a correlation between positions of the releasing laser pulses and the dissectate trajectories can be determined in said learning mode. Using appropriate methods, such as machine learning algorithms as explained below in further detail, this allows for an estimation or prediction of dissectate trajectories in "real" samples, i.e. in an operation mode where actual sample regions of interest are obtained as the dissectates.

The method according to the present invention particularly preferably includes that the dissectates are obtained in the learning mode by applying at least the steps a) and b) to the sample or a further test or dummy sample.

If the (same) sample is used in the learning mode, this preferably includes that less relevant or diagnostically less important parts or regions of the sample (which e.g. are not intended to be analyzed in a subsequent method step such as genetic or other biochemical analysis) are used for obtaining the "test dissectates". However, such parts or regions are preferably selected such that particularly their mechanical properties (thickness, viscosity, hardness, brittleness, dryness, flexibility, etc.) correspond to those of relevant parts or regions which are operated on in a subsequent regular operating mode, in order to make the predictions obtained in the learning mode applicable to these sample parts or regions.

Essentially the same holds true if "dummy" samples are operated on in the learning mode. A dummy sample may e.g. be a sample including a preparation of a biological object which is obtained in the same or essentially the same manner as the "real" or relevant sample operated on after the learning mode, or the dummy sample may be provided in a different way ensuring that particularly the mechanical properties mentioned above in examples correspond or essentially correspond to those of the real sample comprising regions to be analyzed.

Preferably, the method provided according to the present invention may be performed using a control unit of the laser microdissection system. The control unit may be provided as one or comprising several electronic components in the laser microdissection system or remote therefrom, essentially as described for a "computer system" in connection with FIG. 1, to which specific reference is made here. A control unit may be or include a computer system and/or one or more electronic units provided separately from a computer system. Parts of a control unit may be provided as components of a laser microdissection system, in proximity thereto, and/or remote therefrom, such as in a "cloud" or a central or distributed server arrangement.

The method according to the present invention may, in an embodiment, particularly comprise that the learning mode is performed using a machine learning method, as essentially described hereinbelow as well. Input training data or vectors to the machine learning method, or to an artificial intelligence method being part thereof or representing the machine learning method, may particularly include or be based on any of the features determined as explained hereinbelow, such as terminal positions of dissectate trajectories or the releasing laser pulses or correlations thereof, wherein particularly such data can be classified, grouped, outlier eliminated, smoothed, generalized, statistically analyzed or further processed according to any method known in the prior art to form suitable input data.

Input training data or vectors, or more generally data used in the machine learning algorithm may also include or describe one or more sample and/or process parameter, such as, but not limited to, at least one of a sample thickness, a sample dryness, a sample viscosity, a sample brittleness, a shape of the dissectate regions, a size of the dissectate regions, an operating temperature, parameters of a medium surrounding the sample, such as air, a pulse energy of one or more of said laser pulses, a width of one or more of said laser pulses, one or more focusing parameters of one or more of said laser pulses and a focus position of one or more of said laser pulses.

Particularly, the method provided according to the present invention may comprise, in an embodiment, that the determination of the parameters of the dissectate trajectories includes determining landing positions of the dissectates as terminal positions of the dissectate trajectories. As the starting positions of the dissectates are known, for example from coordinates used for the laser when applying the releasing laser pulses, the determination of the terminal positions of the dissectate trajectories, which are the "landing positions" in a dissectate receptacle or on any surface corresponding to such a position, may already suffice to obtain sufficient features relevant for the prediction made according to the present invention.

Be it known, however, that any further feature, such as a curvature or a length of a trajectory, and a trajection speed, may also be determined according to corresponding embodiments of the present invention. For example, the velocity of dissectates, whose initial value is known to increase with decreasing diameter, may be included as a measured value or a value derived from geometrical properties.

The method according to the present invention may advantageously comprise that the landing positions of the dissectates are determined on one or more target surfaces in a defined spatial relationship to the dissectate regions. Using a target surface in a defined spatial relationship for the determination of the terminal positions of the trajectories may particularly serve to be able transfer the results of the prediction to "real life" samples. The spatial relationship is therefore preferably selected such that it essentially corresponds to that of a dissectate receptacle or a collection unit vis-à-vis the dissectate regions.

The target surfaces used in a corresponding embodiment of to the present invention, or at least one of a plurality of such target surfaces, may particularly include at least one of an auxiliary surface used in the learning mode at a position corresponding to openings of the receptacles of the dissectate collection unit, a bottom surface of receptacles of the dissectate collection unit, and a wall surface of the receptacles of the dissectate collection unit. In all cases, determining a landing position on such a surface ensures that the dissectates are properly collected in the desired vessels.

In a particularly preferred embodiment of the present invention, a first virtual plane corresponding to at least a part of a sample plane in which the dissectate regions are arranged, and at least one second virtual plane corresponding to at least a part of the one or more target surfaces may defined for the determination of said landing positions. By correlating positions on the first and the one or more second virtual planes, relevant parameters of the dissectate trajectories may be reliably determined and/or derived according to an embodiment of the invention.

The first virtual plane and the at least one second virtual plane may, in a preferred embodiment of the present invention, be subdivided in a plurality of subregions of equal or different size and/or shape, particularly into fields or a rectangular grid, to determine the parameters of the dissectate trajectories. Each position in a specific field of a grid, i.e. of a certain subregion, may be referred to by referring to this subregion, simplifying the learning process and any referencing to positions by generalizing and "binning" the specific positions within the subregions.

The subregions of the first virtual plane may, in the embodiment just mentioned, be associated to the dissectate regions and/or releasing positions and the subregions of the second virtual plane may be associated to the landing positions. Furthermore, as mentioned, the determination of the parameters of the dissectate trajectories may include correlating one or more of the subregions of the first virtual plane and one or more of the subregions of the second virtual plane.

To partially repeat what was already mentioned before, in an embodiment of the present invention, step a) may include partially circumcising the dissectate regions along an open cutting path defined on the basis of a cutting line and thereafter releasing the dissectate regions by applying the releasing laser pulses of the laser beam to close the cutting path, such as in "catapulting" or "gravity transfer" methods as generally known from the prior art. In a further embodiment, step a) may also include partially circumcising the dissectate regions along an open cutting path defined on the basis of the cutting line and thereafter releasing the dissectate regions by applying one or more releasing laser pulse of the laser beam to positions within the dissectate regions. In a yet further embodiment, however, step a) may also include completely circumcising the dissectate regions along a closed cutting path defined on the basis of the cutting line, after which the dissectate still adheres to a remainder of the sample by a retaining force, particularly by adhesion, and thereafter releasing the dissectate regions by applying one or more releasing laser pulses of the laser beam to positions within the dissectate regions, particularly to overcome the retaining force.

In the method just mentioned, the sample may e.g. provided on the bottom of a dissectable sample receptacle such as a petri dish filled with a liquid, particularly an aqueous liquid. In this case, the dissectable sample receptacle may be cut in step a), after which the dissectate is, however, not released from the remainder of the sample receptacle by virtue of a surface tension of the liquid. It may then, in step b), detached by applying a releasing laser pulse to overcome the surface tension.

The method according to the present invention may, as repeatedly mentioned before, be used in connection with a multiwell plate as the dissectate collection unit, the multiwell plate comprising the dissectate receptacles in any number possible. Reference is made to the numbers as indicated above.

A laser microdissection system comprising a laser unit providing a laser beam is also part of the present invention. According to the present invention, the laser microdissection system comprises a control unit which is adapted to cause the laser microdissection system to at least partially circumcise dissectate regions of the sample and to release the dissectate regions from the sample as the dissectates using laser pulses of the laser unit in a step a), to transfer the dissectate regions along dissectate trajectories into receptacles of a dissectate collection unit in a step b), and to position the receptacles of the dissectate collection unit to collect the dissectates using a positioning unit in a step c), wherein step c) is typically performed before step a).

According to the present invention, the control unit of the laser microdissection system is adapted to cause the positioning to automatically position the receptacles of the dissectate collection unit on the basis of estimates of the dissectate trajectories, and to obtain the estimates of the dissectate trajectories in a learning mode, the learning mode including obtaining dissectates by repeatedly performing at least steps a) and b) mentioned above, wherein parameters of the dissectate trajectories are determined for a plurality of dissectates formed at different dissectate regions.

As to specific features of the laser microdissection system provided according to the present invention and embodiments thereof, reference is made to the explanations above relating to the inventive method and its embodiments. Laser microdissection systems according to embodiments of the present invention may particularly be adapted to perform corresponding methods and embodiments thereof.

The present invention also relates to a computer program with a program code for performing a method according to any one the embodiments of the present invention when the computer program is run on a processor, particularly of a control unit of a laser microdissection system provided according to the present invention or any embodiment thereof.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention and preferred embodiments thereof comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, e.g., be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

That is, a computer program with a program code for performing the method according to the present invention or any embodiment thereof when the computer program is run on a processor, particularly a processor which is part of the processing apparatus referred to above is also part of the present invention.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein and embodiments thereof. The data stream or the sequence of signals may, for example, be configured to be transferred via a data communication connection, for example via the internet.

A yet further embodiment of the invention comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein and embodiments thereof. Generally, the methods are preferably performed by any hardware apparatus.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

As mentioned above in connection with the learning mode provided according to the present invention, the present invention and embodiments thereof can be used in connection with, or include, machine-learning.

Therefore, embodiments of the present invention may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations provided by a user), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is continuously increased, leading to software agents that become better at the task they are given (as evidenced by increasing rewards).

Furthermore, some further techniques may be applied to some of the machine-learning algorithms according to an embodiment. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms according to embodiments of the present invention. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge accordingly.

Machine-learning algorithms are usually based on a machine-learning model. In other words, the term "machine-learning algorithm" may also denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may, according to the comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

The present invention and preferred embodiments thereof are further described with reference to the appended drawings illustrating embodiments of the invention.

SHORT DESCRIPTION OF THE FIGURES

Elements of identical or corresponding function and/or technical realization are indicated with like reference numerals hereinbelow. Repeated explanations are omitted for reasons of generality only. If, hereinbelow, reference is made to method steps, the corresponding explanations likewise apply to technical components of device parts used or adapted to realize such method steps and vice versa.

Embodiments

FIG. 1 schematically illustrates a laser microdissection system 1000 which may be adapted to be used according to an embodiment of the present invention.

The laser microdissection system 1000 comprises a microscope system 1100 and a computer system 1200. The microscope system 1100 includes a microscope stand 1 comprising operating or user interface means not specifically indicated. A laser unit 2 is part of the microscope system 1100, the laser unit 2 emitting a laser beam 12 which is illustrated in the form of a dotted line. The laser beam 12 is passed through a deflection unit 3 as generally explained above, and through an objective 14 fixed to a turret not specifically referenced.

The deflection unit 3 may particularly include rotatable glass wedges to provide a relative motion of a target point of the laser beam 12 vis-à-vis a sample 20 arranged on a sample carrier 40 positioned on a microscope stage 4. Alternatively, an essentially fixed laser beam 12 may be used and a relative motion of the target point of the laser beam 12 vis-à-vis the sample 20 may be provided by motorically or manually moving the microscope stage 4. Combinations of these motion options may also be provided in embodiments.

The microscope system 1100 particularly may comprise tubus optics 5 which may be adapted to observe the sample 20 via oculars not specifically illustrated and to which a camera or camera system 6 may be attached to obtain electronic images. Beneath the microscope stage 7, a positioning means 7 for a dissectate collection unit may be provided, the latter particularly being positionable by using an actuator 16 particularly comprising a piezo motor.

The computer system 1200 may be configured to execute a machine learning algorithm. The computer system 1200 and the microscope system 1100 may be separate entities but can also be integrated together in one common housing. The computer system 1200 may be part of a central processing system of the microscope system 1100 or may comprise such a system, as mentioned, and/or the computer system 1200 may be part of a subcomponent of the microscope system 1100, such as a sensor, an actor, a camera or an illumination unit, etc. of the microscope system 1100. It may interact with the microscope system 1100 as illustrated with bidirectional arrows 1300 using known communication means in wired or wireless form. Together with a separate control unit 18 which is illustrated here as being part of the microscope system 1100 without the intention to be limiting, the computer system 1200 may be used to control any operations of the laser microdissection system 1000 and may therefore form a common control unit.

The computer system 1200 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 20 may comprise any circuit or combination of circuits. In one embodiment, the computer system 20 may include one or more processors which can be of any type.

As used herein, the term "processor" may refer to any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 20 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems.

The computer system 1200 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 1200 may also include a display device, one or more speakers, and a keyboard and/or controller, which can include a mouse, trackball, touch screen, voice-recognition device, or any other device that permits a system user to input information into and receive information from the computer system 20 and or the overall arrangement 100. As illustrated, a screen of the computer 20 and a keyboard and the like may be user interface means referred to herein.

Figure 2A:
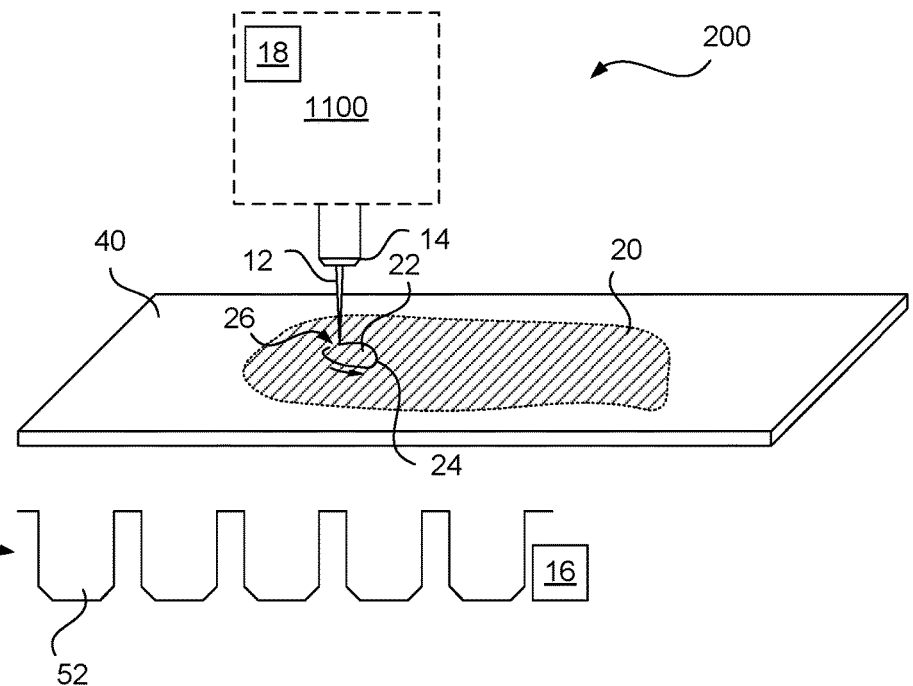
FIGS. 2A to 2C schematically illustrate steps of a method provided according to an embodiment of the present invention.
Figure 2B:
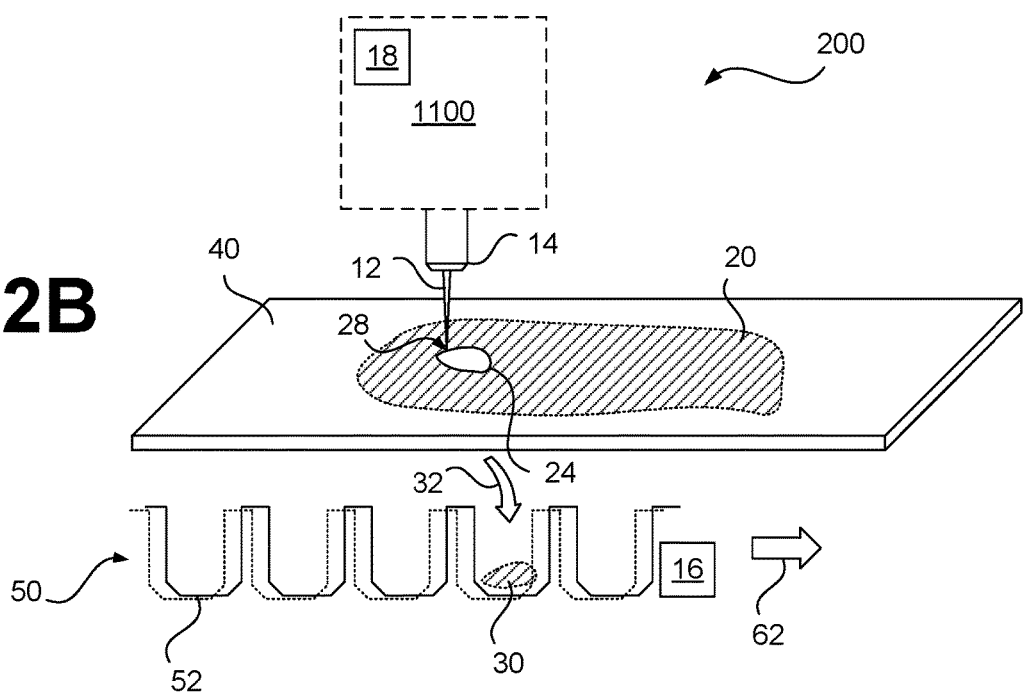
Figure 2C:
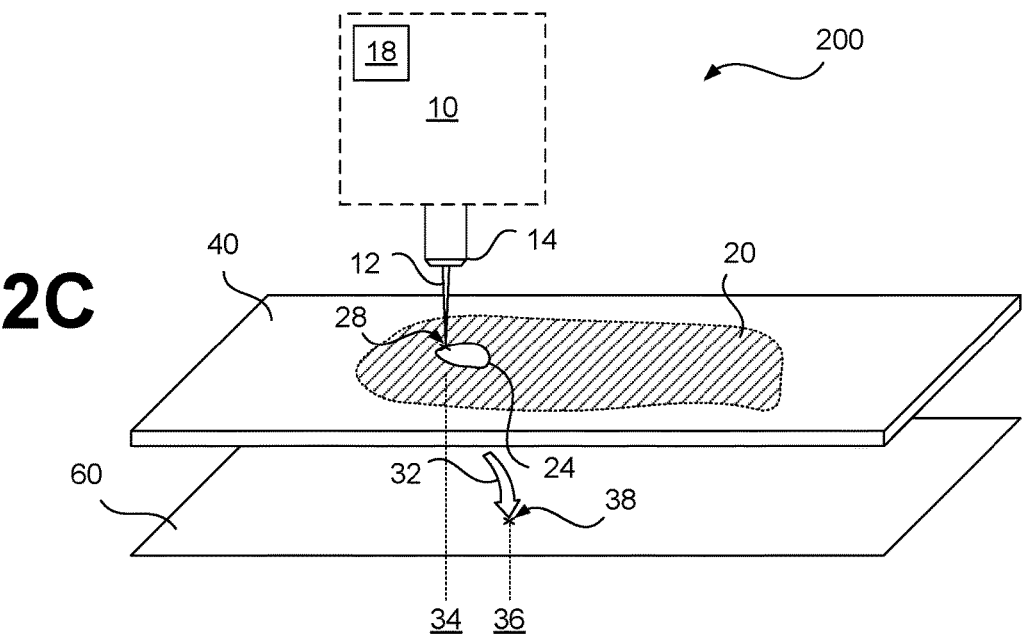

FIGS. 2A to 2C illustrate steps of a method provided according to an embodiment of the present invention in schematic partial views 200 of components of a laser microdissection system such as the laser microdissection system 1000 shown in FIG. 1 in a specific embodiment.

As shown in FIG. 2A, the laser beam 12 is focused by the lens 12 attached to the microscope system 1100 to a target position 26 on the sample 20 which is arranged on a sample carrier 40 such as a microscopic slide. By effecting a relative motion of the target position 26 in relation to the sample 20 in the manner mentioned before, a dissectate region 22 of the sample 20 may be at least in part circumcised, as indicated by an unlabeled arrow in the plane of the sample 22, by forming a cutting line 24 comprising a plurality of laser points, i.e. by applying a series of laser pulses of the laser beam 12 along a cutting path on the basis of signals as provided by the control unit 18 schematically illustrated.

A sample collection unit 50, which is positionable by using an actor 16 already mentioned before, or more generally a positioning unit 16, is arranged beneath the sample 20 in the embodiment shown. The embodiment illustrated here therefore corresponds to a "gravity transfer" variant of a laser microdissection method. In other configurations, such as in "catapulting", an inverse arrangement generally known to the skilled person is used.

As shown in FIG. 2B, the dissectate region 22 is released from the sample 20 as a dissectate 30 by applying a releasing laser pulse of the laser beam 12 to a release position 28 in or adjacent to the dissectate region 22, and the dissectate 30 is transferred by releasing the dissectate region 22 along a dissectate trajectory 32 illustrated in the form of a bent arrow into a receptacle 52 of a dissectate collection unit. The dissectate trajectory 32 depends on, e.g., a spatial relation of the releasing position 28 and the dissectate regions 22, and on a plurality of further parameters as previously discussed.

The dissectate 30 is collected in a receptacle 52 of the dissectate collection unit 50 which is, as illustrated with an arrow 62 and a previous position of the dissectate collection unit 50 shown with a dotted line, positioned in relation to the dissectate region 22 and based on the dissectate trajectory 32, such that the receptacle 52 or a centerline thereof deviates from a position vertically beneath the dissectate region 22. Doing so, as mentioned, serves to improve the reliability of the dissectate 30 collection when the trajectory 32 deviates from a vertical direction. Positioning may be realized using the actuator 16 on the basis of signals of the control unit 18 and/or a computer system 1200 explained hereinbefore.

Positioning the receptacles 52 of the dissectate collection unit 50 is therefore automatically performed using a positioning unit 16, and it is performed, as illustrated in FIG. 2C, on the basis of estimates of the dissectate trajectories 32 being obtained in a learning mode. The learning mode may particularly include obtaining dissectates 30, generally as explained before, and to determine parameters of the dissectate trajectories 32 for a plurality of different dissectate regions 22.

As shown in FIG. 2C, a landing position 38 of the dissectate 30 may be determined on a target surface 60 in a defined spatial relationship to the dissectate regions 22 and/or a final releasing laser pulse such as position 28. In this way, an initial position 34 and a terminal position 36 of the dissectate trajectory 32 may be determined. For further details, reference is made to the explanations above.

Figure 3:
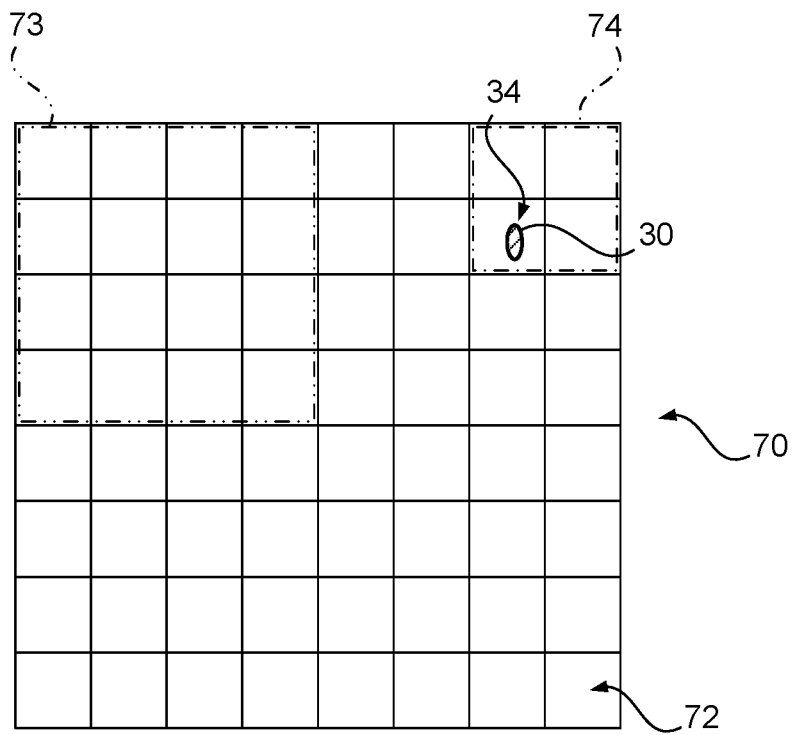
FIG. 3 schematically illustrates virtual planes used in a method provided according to an embodiment of the present invention.
Figure 3:
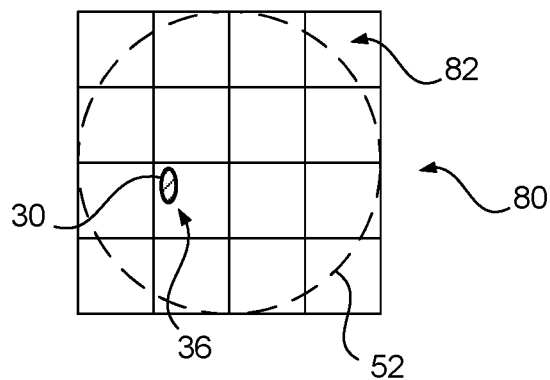

FIG. 3 schematically illustrates virtual planes used in a method provided according to an embodiment of the present invention.

A first virtual plane 70 corresponding to at least a part of a sample plane 20 in which the dissectate regions 22 are arranged, and a second virtual plane 80 corresponding to at least a part of the target surface 60 shown in FIG. 2C, or a plane corresponding to positions in a dissectate collection arrangement 50, e.g. the bottom of wells of a multiwell plate, are defined for the determination of the terminal positions 36 of the dissectate trajectories 32.

The first virtual plane 70 and the second virtual plane 80 are each subdivided in a plurality of subregions 72, 82 to determine the parameters of the dissectate trajectories 32. To this purpose, subregions 72 of the first virtual plane 70 are associated to the dissectate regions 22 and/or releasing positions 28 and subregions 82 of the second virtual plane 80 are associated to the landing positions 38. A dissectate 30 dissected at a starting position of a dissectate trajectory 32 is illustrated in the first virtual plane 70 and a dissectate 30 landing at a terminal position of a dissectate trajectory 32 is illustrated in the second virtual plane 80.

A perimeter of a dissectate receptacle 52 is illustrated with a dashed line in the second virtual plane, which translates to a region enclosed by a line 73 in the first virtual plane 70. By correlating one or more of the subregions 72 of the first virtual plane 70, indicated with 74, and one or more of the subregions 82 of the second virtual plane 80, indicated with 73, learning data may be obtained.

Figure 4:
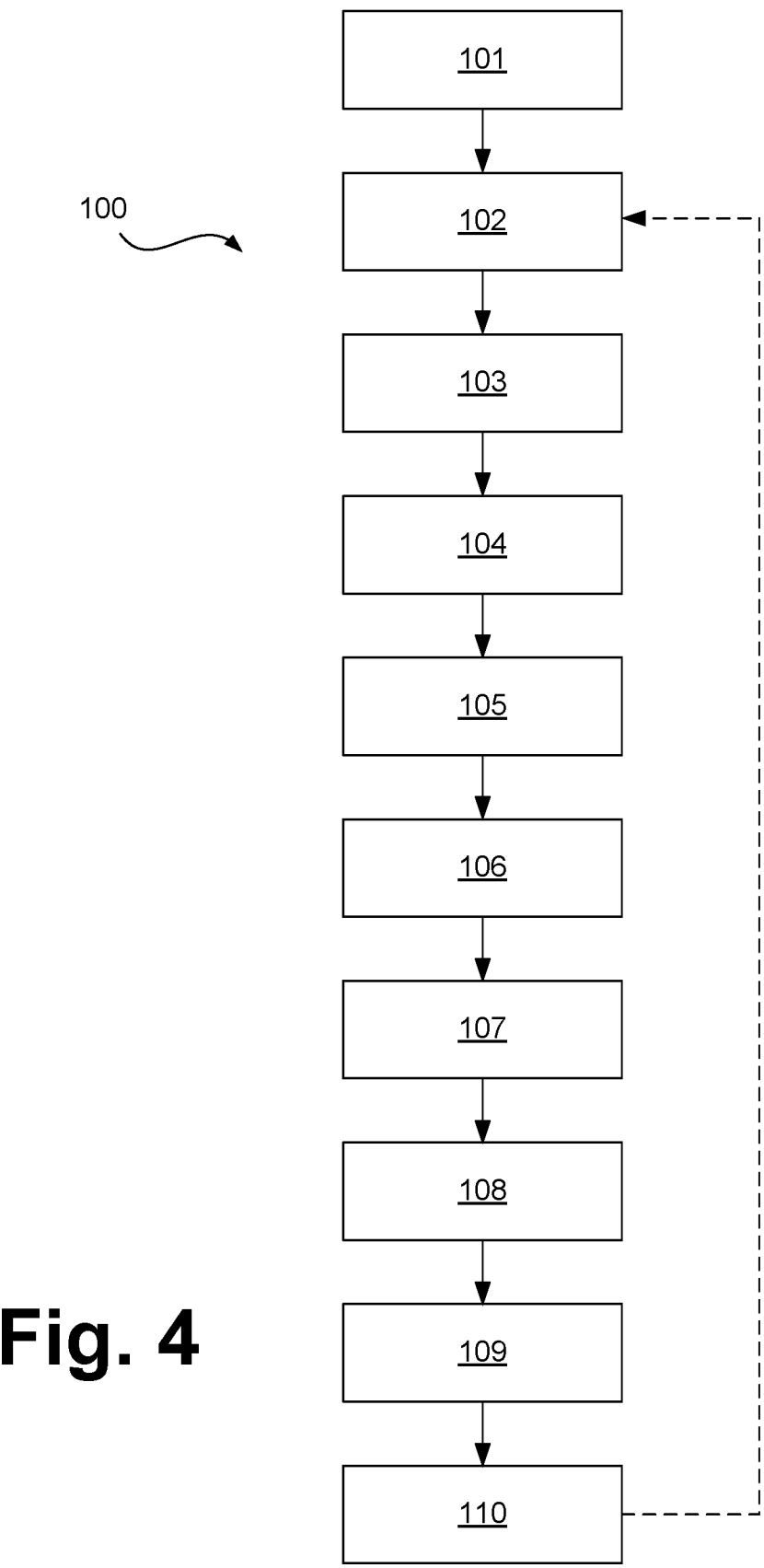
FIG. 4 schematically illustrates a method provided according to an embodiment of the present invention in the form of a procedural plan.

FIG. 4 schematically illustrates a method provided according to an embodiment of the present invention in the form of a procedural plan.

In a method step 101, a laser microdissection system 1000 such as that shown in FIG. 1 is provided, and a sample 20 as well as a surface 40 shown before are positioned as essentially described hereinbefore.

In a step 102, a virtual plane 70 such as the virtual plane 70 shown in FIG. 3 is subdivided in a plurality of subregions 72 and a further virtual plane 80 is likewise defined and subdivided in subregions 82.

A step 103 includes marking at least one shape, i.e. a dissectate region 22, in the sample and in one subregion 72 of the virtual plane 70 which is intended to be dissected to form a dissectate 30 thereafter.

In step 104, the position of the subregion 72 in which the dissectate region 22 is marked in step 103 is stored for later correlation with a landing position 32 or a corresponding subregion 82 of a further virtual plane 80.

A dissectate regions 22 of the sample 20 to be obtained as a dissectates 30 is then dissected and effected to traject according a dissectate trajectory in a step 105 in a manner explained hereinbefore.

In a step 106, the surface 40 shown before is inspected, particularly using an automatic inspection system, in order to recognize a dissectate 30 trajected according a dissectate trajectory to the landing position 38.

In a step 107, the surface 40 or a virtual plane 82 corresponding thereto is, essentially as explained hereinbefore, subdivided into the subregions 82 and the dissectate 30 detected in step 106 is associated with one of the subregions 82.

A step 108 includes storing the position of the subregion 82 to which the dissectate 30 was associated in step 107 for correlation with the corresponding subregion 72 of the virtual plane corresponding to the sample plane.

As shown in the form of a step 109, a correlation of is made between the subregion 72 of the first virtual plane 70 the subregion 82 of the second virtual plane 80 to determine parameters of the dissectate trajectory 32.

As shown with a dashed arrow, steps 102 to 110 can be repeated until a sufficient amount of data is collected and/or an automatic learning mode is completed to be used in later method steps.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1000 Laser microdissection system
1100 Microscope system
1200 Computer system
1300 Communication
1 Microscope stand
2 Laser unit
3 Deflection unit
4 Microscope stage
5 Tubus
6 Camera (system)
7 Positioning unit
12 Laser beam
14 Lens
16 Actuator
18 Control unit
20 Sample
22 Dissectate region
24 Cutting line
26 Releasing position
30 Dissectate
32 Dissectate trajectory
34 Trajectory starting position
36 Trajectory terminating position
38 Landing position
40 Sample carrier
50 Dissectate collection unit 52 Dissectate receptacle
60 Target surface
62 Positioning movement
70 First virtual plane
72 Subregion of first virtual plane
73 Subregions
74 Subregions
80 Second virtual plane
82 Subregion of second virtual plane
200 Partial views
100 Method for obtaining dissectates
101 Provision step
102 Definition and subdivision of first virtual plane
103 Marking of dissectate region
104 Storing marked dissectate region
105 Excising dissectate
106 Determining dissectate
107 Defining and subdivision of second virtual plane
108 Storing subregion with dissectate
109 Correlating subregions

What is claimed is:

1. A method for obtaining dissectates from a microscopic sample using a laser microdissection system comprising a laser unit, the method comprising:
   a) at least partially circumcising and releasing from the sample dissectate regions of the sample as the dissectates using laser pulses provided by the laser unit;
   b) transferring the dissectates, by being released from the sample, along dissectate trajectories into receptacles of a dissectate collection unit; and
   c) positioning the receptacles of a dissectate collection unit using a positioning unit to collect the dissectates,
   wherein the positioning of the receptacles of the dissectate collection unit using the positioning unit is automatically performed based on estimates of the dissectate trajectories, the estimates of the dissectate trajectories being obtained in a learning mode, the learning mode including obtaining dissectates by repeatedly performing at least steps a) and b), and
   wherein parameters of the dissectate trajectories are determined for a plurality of dissectates formed at different dissectate regions.

2. The method of claim 1, wherein the dissectates are obtained in the learning mode by applying at least steps a) and b) to the sample or a further test or dummy sample.

3. The method of claim 1, wherein the learning mode is performed using a control unit of the laser microdissection system.

4. The method of claim 1, wherein the learning mode is performed using a machine learning algorithm.

5. The method of claim 4, wherein the machine learning algorithm is performed using data including or describing one or more sample and/or process parameters including at least one of: a sample thickness, a sample dryness, a sample viscosity, a sample brittleness, a shape of the dissectate regions, a size of the dissectate regions, an operating temperature, parameters of a medium surrounding the sample, a pulse energy of one or more of the laser pulses, a width of one or more of the laser pulses, one or more focusing parameters of one or more of the laser pulses, and a focus position of one or more of the laser pulses.

6. The method of claim 1, wherein a determination of the parameters of the dissectate trajectories includes determining landing positions of the dissectates.

7. The method of claim 6, wherein the landing positions of the dissectates are determined on one or more target surfaces in a defined spatial relationship to the dissectate regions.

8. The method of claim 7, wherein at least one of the one or more target surfaces includes at least one of an auxiliary surface used in the learning mode at a position corresponding to openings of the receptacles of the dissectate collection unit, a bottom surface of receptacles of the dissectate collection unit, and a wall surface of the receptacles of the dissectate collection unit.

9. The method of claim 7, wherein a first virtual plane corresponding to at least a part of a sample plane in which the dissectate regions are arranged, and at least one second virtual plane corresponding to at least a part of the one or more target surfaces are defined for the determination of the landing positions.

10. The method of claim 8, wherein the first virtual plane and the at least one second virtual plane are at least in part subdivided into a plurality of subregions of equal or different shape and/or size.

11. The method of claim 9, wherein the subregions of the first virtual plane are associated with the dissectate regions and/or releasing positions thereof,
   wherein subregions of the at least one second virtual plane are associated with the landing positions, and
   wherein the determination of the parameters of the dissectate trajectories includes correlating one or more of the subregions of the first virtual plane and one or more of the subregions of the second virtual plane.

12. The method of claim 1, wherein step a) includes:
   partially circumcising the dissectate regions along an open cutting path defined based on a cutting line and thereafter releasing the dissectate regions by applying one or more releasing laser pulses of the laser beam to close the cutting path, or
   partially circumcising the dissectate regions along an open cutting path defined based on the cutting line and thereafter releasing the dissectate regions by applying one or more releasing laser pulse of the laser beam to positions within the dissectate regions, or
   completely circumcising the dissectate regions along a closed cutting path defined based on the cutting line and thereafter releasing the dissectate regions by applying one or more releasing laser pulses of the laser beam to positions within the dissectate regions.

13. The method of claim 12, wherein the sample is provided on a bottom of a dissectable sample receptacle filled with a liquid.

14. The method of claim 1, wherein the dissectate collection unit comprises a multiwell plate.

15. A laser microdissection system, comprising:
   a laser unit; and
   a control unit, the control unit being configured to cause the laser microdissection system to
   a) at least partially circumcise dissectate regions of a sample and to release the dissectate regions from the sample as the dissectates using laser pulses provided by the laser unit,
   b) transfer the dissectates, by releasing the dissectates from the sample, along dissectate trajectories into receptacles of a dissectate collection unit, and
   c) position the receptacles of the dissectate collection unit using a positioning unit to collect the dissectates,
   wherein the control unit is configured to cause the positioning unit to automatically position the receptacles of the dissectate collection unit based on estimates of the dissectate trajectories, and to obtain the estimates of the dissectate trajectories in a learning mode, the learning mode including obtaining dissectates by repeatedly performing at least steps a) and b), and wherein parameters of the dissectate trajectories are determined for a plurality of dissectates formed at different dissectate regions.

16. One or more non-transitory computer-readable mediums having processor-executable instructions stored thereon for performing a method for obtaining dissectates from a microscopic sample using a laser microdissection system comprising a laser unit, wherein the processor-executable instructions, when executed, facilitate the following being performed:

a) at least partially circumcising and releasing from the sample dissectate regions of the sample as the dissectates using laser pulses provided by the laser unit;

b) transferring the dissectates, by being released from the sample, along dissectate trajectories into receptacles of a dissectate collection unit; and c) positioning the receptacles of a dissectate collection unit using a positioning unit to collect the dissectates, wherein the positioning of the receptacles of the dissectate collection unit using the positioning unit is automatically performed based on estimates of the dissectate trajectories, the estimates of the dissectate trajectories being obtained in a learning mode, the learning mode including obtaining dissectates by repeatedly performing at least steps a) and b), and wherein parameters of the dissectate trajectories are determined for a plurality of dissectates formed at different dissectate regions.

* * * * *